(12) United States Patent
Panizzolo (10) Patent No.: US 8,770,333 B2
(45) Date of Patent: Jul. 8, 2014

(54) VEHICLE

(75) Inventor: Fabrizio Panizzolo, Padua (IT)

(73) Assignee: Dana Italia S.p.A., Arco (Trento) (IT)

( * ) Notice: Subject to any disclaimer, the term of this patent is extended or adjusted under 35 U.S.C. 154(b) by 1031 days.

(21) Appl. No.: 12/228,376

(22) Filed: Aug. 12, 2008

(65) Prior Publication Data

US 2009/0044647 A1    Feb. 19, 2009

(30) Foreign Application Priority Data

Aug. 14, 2007   (IT) .............................. MI2007A1677

(51) Int. Cl.
*B60K 23/04* (2006.01)
*B62D 11/10* (2006.01)
*F16H 1/28* (2006.01)

(52) U.S. Cl.
CPC .............. *B60K 23/04* (2013.01); *B62D 11/10* (2013.01); *F16H 1/28* (2013.01)
USPC ............ 180/253; 180/364; 180/369; 475/231

(58) Field of Classification Search
USPC .............. 180/252, 253, 6.24, 6.26, 6.66, 364, 180/369, 76, 414; 475/231, 249
See application file for complete search history.

(56) References Cited

U.S. PATENT DOCUMENTS

| 3,315,759 | A | * | 4/1967 | Bohlen ........................ 180/6.24 |
| 4,893,525 | A |   | 1/1990 | Gabor |
| 5,215,506 | A |   | 6/1993 | Hara |
| 6,460,677 | B1 | * | 10/2002 | Roscoe ........................ 192/84.7 |
| 7,832,521 | B2 | * | 11/2010 | Levell et al. .................. 180/364 |
| 2006/0073931 | A1 | * | 4/2006 | Teraoka ........................ 475/231 |
| 2007/0142157 | A1 | * | 6/2007 | Nofzinger et al. ............. 475/231 |

FOREIGN PATENT DOCUMENTS

| EP | 1162383 | * | 12/2001 |
| EP | 1918176 A1 | | 5/2008 |
| JP | 53 106411 U | | 8/1978 |
| JP | 10 230756 A | | 9/1998 |

* cited by examiner

*Primary Examiner* — Anne Marie Boehler
(74) *Attorney, Agent, or Firm* — Marshall & Melhorn, LLC

(57) ABSTRACT

A vehicle comprises a chassis, a pair of driving wheels, a pair of idle wheels, at least one steering group, and a differential. The steering group is capable of positioning one of the pairs of wheels in a steering geometry where an axis of each of the wheels of the pair of wheels capable of being positioned by the steering group intersects with the remaining axis within a ground-support quadrilateral formed by the pairs of wheels. The differential comprises an outer case, an inner case, a selective engagement, a selective blocking means, and a selective direct gearing means. When the inner case is coupled to the outer case a first half-shaft and a second half-shaft are driven similarly and when the inner case is coupled to the chassis and one of the half-shafts is drivingly engaged with a crown gear the first half-shaft and the second half-shaft are driven opposingly.

9 Claims, 5 Drawing Sheets

Fig. 1

VEHICLE

FIELD OF THE INVENTION

The present invention relates to an improved vehicle.

BACKGROUND

The term "vehicle" refers to common automobiles but also elevator trucks, earth-moving vehicles, off-road and non-off-road telescopic trucks, military vehicles, tractors, air platforms, i.e. all vehicles which, during their normal use, effect maneuvers in which the relative wheels have a steering configuration necessary for allowing a movement, for example straight or curved, of the vehicle itself.

In currently known vehicles, the steering, i.e. the positioning of a particular desired orientation of at least one pair of wheels, is generally controlled mechanically by means of a rack coupling activated by the movement of the steering wheel or hydraulically by means of a hydraulic auxiliary system again controlled by the rotation of the steering wheel.

In particular, the known steering groups act on the wheels of an axle which are constrained to the vehicle by means of structural extensions.

In order to effect a turn, when desired, the presence is currently envisaged of a rigid rod element connected at one end to a steering stem by means of a spherical coupling and at the other end to the wheel-holder group by means of a pin, this being the construction solution of the integrated steering cylinder type mainly used for axles to be installed on off-road vehicles.

At present, therefore, in order to effect a sudden turn, a user exerts a translatory movement, generally, as already mentioned, by means of the steering wheel, to the above stem of the main cylinder which in turn entrains the other rigid rod element situated in series with the previous stem, into movement.

As this rigid rod element, however, is integrally hinged to the wheel-holder supports of the wheels of a common axle, the latter are concordantly put into movement around respective kingpins through which they are rotatingly connected to the structural extensions. Consequently, the rigid rod elements constrain the wheel-holder supports to rotating in the same direction in response to movement of the steering stem.

The only turns therefore that a current known vehicle can make through the coupling described above falls within the typologies contemplated by the "Ackermann"-type geometry in which the axes of the steering wheels of a vehicle intersect upon a single point along a line extending from a rear axle of the vehicle when the steering wheels are rotated from a straight advance position.

Unfortunately, however, these known groups have various drawbacks and impose kinematic limits to the vehicle itself on which they are assembled.

In particular they relate to the limited angular deviation of the wheel-holder support as a result of the limited translatory movement of the steering stem.

In other words, unfortunately, the angular deviation of the wheel-holder group around the kingpin is limited within a narrow angular range which cannot exceed what is granted by the translatory movement of the steering stem. Unfortunately the steering mechanism in accordance with Ackermann steering geometry does not allow rotation of the vehicle with respect to a point inside the ground-support quadrilateral of the vehicle.

It is not possible, for example, for present known vehicles to rotate around a center of a non-steering axle, for example, nor is it possible to effect a rotation with respect to the center of the vehicle itself for the above-mentioned kinematic reasons of the known steering mechanisms in accordance with Ackermann steering geometry and also because it is not possible for current known vehicles to impose two opposing rotations on a pair of driving wheels of the same axle.

SUMMARY OF THE INVENTION

An objective of the present invention is to provide a device capable of solving the above drawbacks of the known art in an extremely simple, economical and particularly functional way.

A further objective is to provide a vehicle which enables greater steering angles to be obtained with respect to those which can currently be reached.

Another objective is to provide a vehicle which enables wide steering angles to be obtained without requiring effort on the part of the user acting on the steering wheel, thus improving the maneuverability of the vehicle in limited spaces.

Yet another objective is to provide a vehicle which allows steering around a point inside the vehicle itself such as, for example, the center of a rigid front drive axle or with respect to the center of the vehicle.

An additional objective is to provide a vehicle capable of imposing two opposing rotations on a pair of drive wheels of the same axle.

BRIEF DESCRIPTION OF DRAWINGS

The characteristics and advantages of an improved vehicle according to the present invention will appear more evident from the following illustrative and non-limiting description, referring to the enclosed schematic drawings, in which.

DETAILED DESCRIPTION

Figure 1:
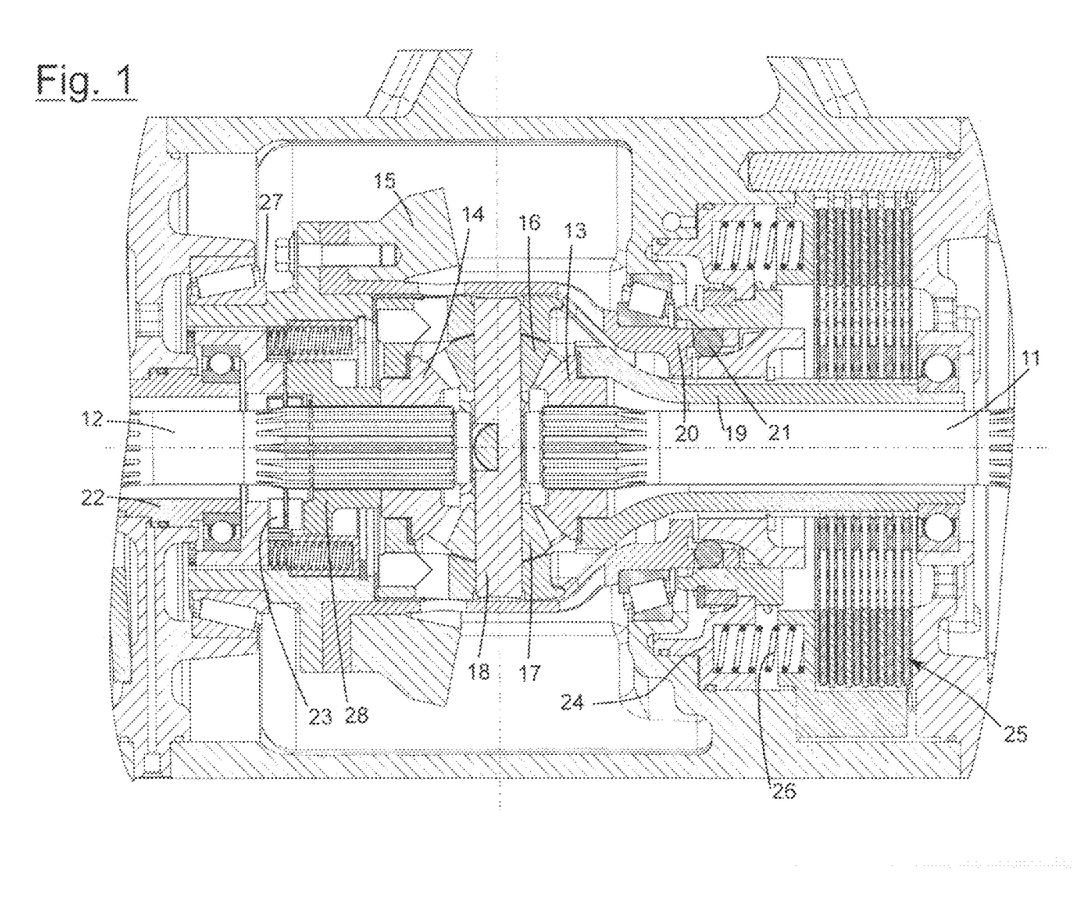
FIG. 1 is a sectional view of a differential of a vehicle according to an embodiment of the present invention.
Figure 5:
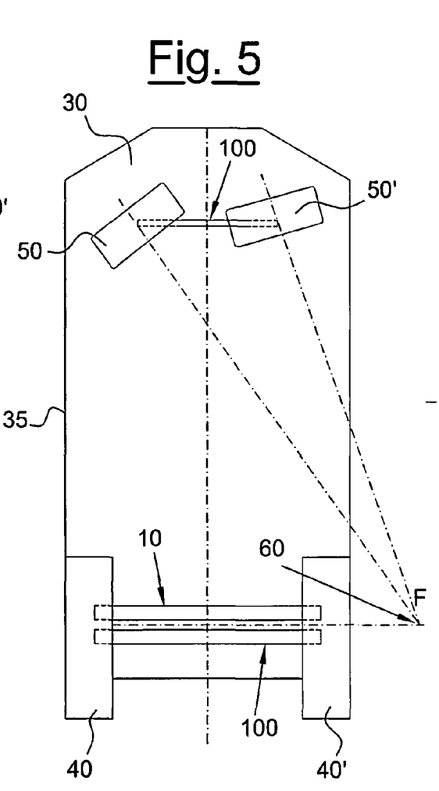
FIG. 5 is a schematic view from above of a vehicle according to an embodiment of the present invention in which the wheels of an axle are positioned according to Ackermann steering geometry.
Figure 6:
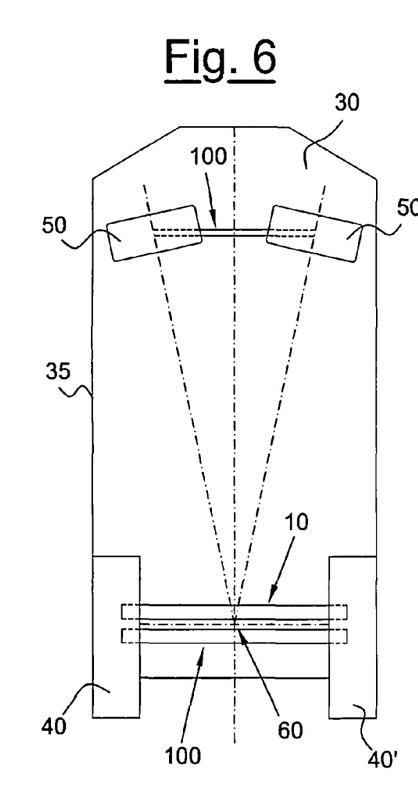
FIG. 6 is schematic view from above of a vehicle according to an embodiment of the present invention in which the wheels of an axle are positioned according to a steering in which the rotation of the vehicle is effected around a center of an axle of the vehicle.
Figure 7:
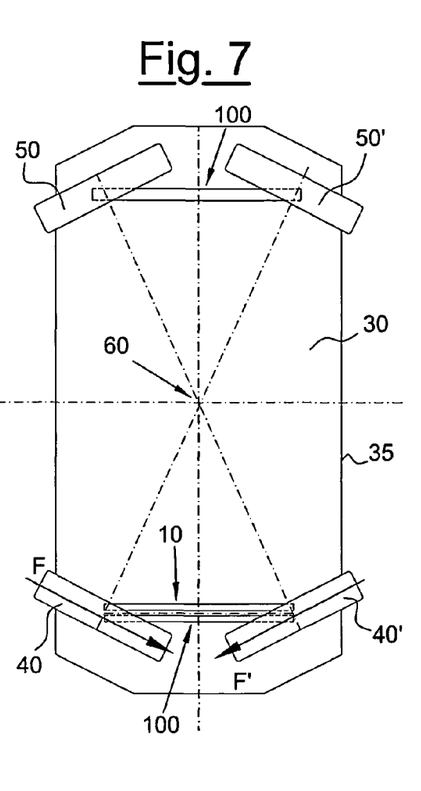
FIG. 7 is a schematic view from above of a vehicle according to an embodiment of the present invention in which the wheels of both of the axles are positioned according to a steering in which the rotation of the vehicle is effected around a vehicle center.

With reference to FIGS. 5-7, these show an improved vehicle 30 according to the present invention equipped with a differential 10 in driving engagement with the driving wheels 40, 40', in a sectional view of an illustrative embodiment in FIG. 1, and two steering groups 100 of the wheels of both axles.

Said vehicle 30 is, like all known common vehicles, equipped with a chassis 35, a pair of driving wheels, indicated in the figures with 40, 40', and a pair of idle wheels 50, 50'.

As already mentioned, the vehicle 30 is equipped with the differential 10 in driving engagement with the driving wheels 40, 40', which comprises, as can be seen in the schematic example represented in FIG. 1, an outer differential case 20 and an inner differential case 19.

In particular, the differential 10 comprises an outer case 20, which can be activated in rotation by a crown gear 15 activated in rotation by a motor, and an internal case 19 in which a first and second end of two half-shafts 11, 12 converge, from facing opposite ends.

The relative wheel-holder groups of the driving wheels 40, 40' are connected to the opposite ends of the two half-shafts 11, 12, those distant from the differential 10.

Two primary toothed gears 13, 14, which communicate with each other for a possible transmission of the movement between two secondary toothed gears 16, 17, are rigidly respectively connected to the ends of the two half-shafts 11, 12 converging inside the inner case 19 of the differential 10.

The latter secondary toothed gears 16, 17 are in turn rotatingly assembled on a pin 18 of the inner case 19 which 18 is substantially orthogonal to the two half-shafts 11, 12.

According to the invention, the differential 10 also comprises selective engagement means 21 of the inner case 19 with the outer case 20, selective blocking means 24, 25, 26 of the inner case 19 with respect to the chassis 35, and direct selective gearing means 22, 23, 27, 28 of the movement coming from the crown gear 15 to one of the two half-shafts 11, 12.

In particular, according to the invention, when the inner case 19 is integral with the outer case 20 a concordant rotation is transmitted to the pair of driving wheels 40, 40', whereas when the selective blocking means 24, 25, 26 and the direct selective gearing means 22, 23, 27, 28 are activated, an opposite rotation with respect to the other is transmitted to the same pair of driving wheels 40, 40'.

In particular, according to an embodiment shown in FIG. 1, the selective engagement means 21 of the inner case 19 with respect to the outer case 20 comprise a set of engagement balls 21 interposed between the inner case 19 and the outer case 20.

As can be seen in the same example of FIG. 1, the selective blocking means 24, 25 26 of the inner case 19 with respect to the chassis 35 comprise at least a first moveable piston element 24, at least a first spring element 26, and at least a clutch element 25 connected to the framework of the chassis 35 wherein the at least one piston element 24 can be selectively moved to compress the at least one spring element 26 and disconnect the engagement means 21 of the inner case 19 with respect to the outer case 20 bringing the inner case 19 to the chassis by means of the clutch element 25 if said clutch is "packed" with respect to the chassis 35.

In the same preferred embodiment shown, the direct selective gearing means 22, 23, 27, 28 of the movement coming from the crown gear 15 to one of the two half-shafts 11, 12 comprise at least a second moveable piston element 22, at least one front engagement unit whether it be with a first set of straight or helical teeth 23 and at least a second spring element, wherein the at least second piston element 22 can be selectively moved to compress the at least second spring element and engage the at least one front engagement unit with a second set of straight or helical teeth 28 drivingly engaged with one of the two half-shafts 11, 12.

From what is described above consequently, once the selective blocking means 24, 25, 26 and the direct selective gearing means 22, 23, 27, 28 have been activated, i.e. blocking the inner case 19 with respect to the chassis 35 and imposing a rotation directly on one of the two half-shafts 11, 12, due to the coupling of the primary toothed gears 13, 14 and secondary toothed gears 16, 17, the two driving wheels 40, 40' are activated in rotation following two opposite rotations.

Consequently, the differential 10 described above according to a preferred embodiment allows the driving wheels 40, 40' to which it is connected to proceed straight with the same angular rate and to effect common curving maneuvers with different and concordant angular rates, when the cases 19, 20 of the differential 10 are integral with each other and form a typical differential, and also according to the invention, the differential 10 allows the two driving wheels 40, 40' to rotate in opposing directions with respect to each other.

Only according to the invention is it consequently possible for the vehicle 30 to effect rotations around its own center in which the two driving wheels 40, 40' proceed with opposing rotational rates of the angular half-axes 11 and 12 wherein, as in the example of FIG. 7, the right wheel 40 follows the instantaneous trajectory indicated in the figure with F whereas the left wheel 40' follows the instantaneous trajectory indicated with F'.

In order to effect said rotation around the center of the vehicle 30 described above, the vehicle also comprises a steering group 100 of the wheels 40, 40', 50, 50' of each axle which allows the relative wheels 40, 40', 50, 50' to be oriented so as to allow rotation of the vehicle 30 with respect to a point inside a ground-support quadrilateral of the vehicle 30 shown in FIG. 7 and also the steering geometries shown in FIG. 5, particularly so that the axes of the wheels 50, 50' of the vehicle 30 intersect upon a single point along a line extending from the wheels 40, 40' of the vehicle 30 when the wheels 50, 50' are rotated from the straight advance position.

Figure 2:
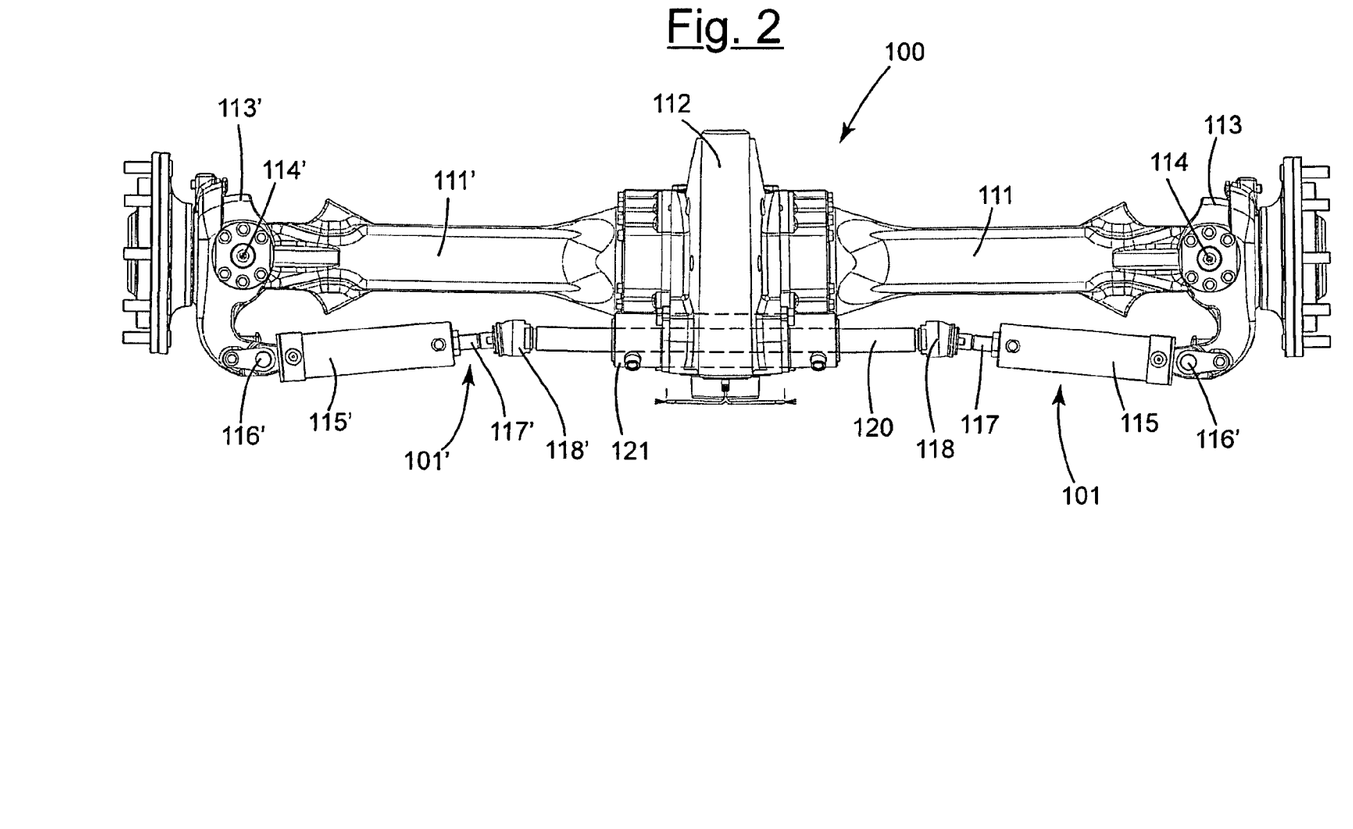
FIG. 2 is a view from above of the steering group of the wheels of an idle axle of the vehicle according to an embodiment of the present invention, the idle axle shown in a straight advance configuration.
Figure 3:
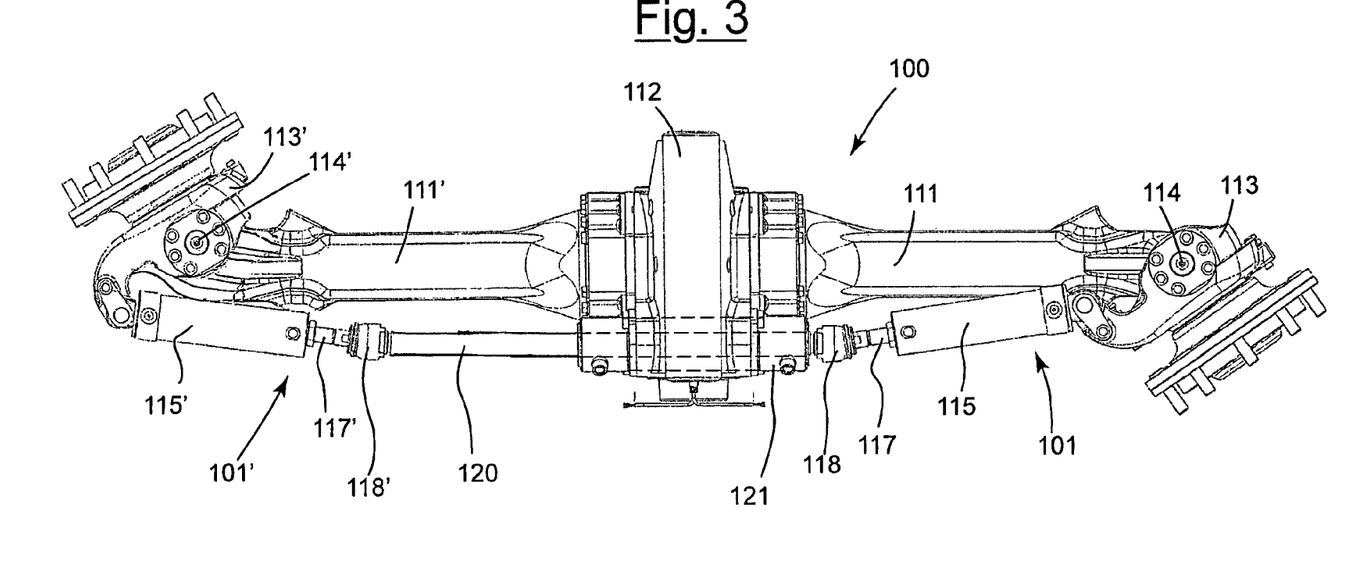
FIG. 3 is a view from above of the steering group of the wheels of the idle axle shown in FIG. 2 in another possible configuration of use according to Ackermann steering geometry.
Figure 4:
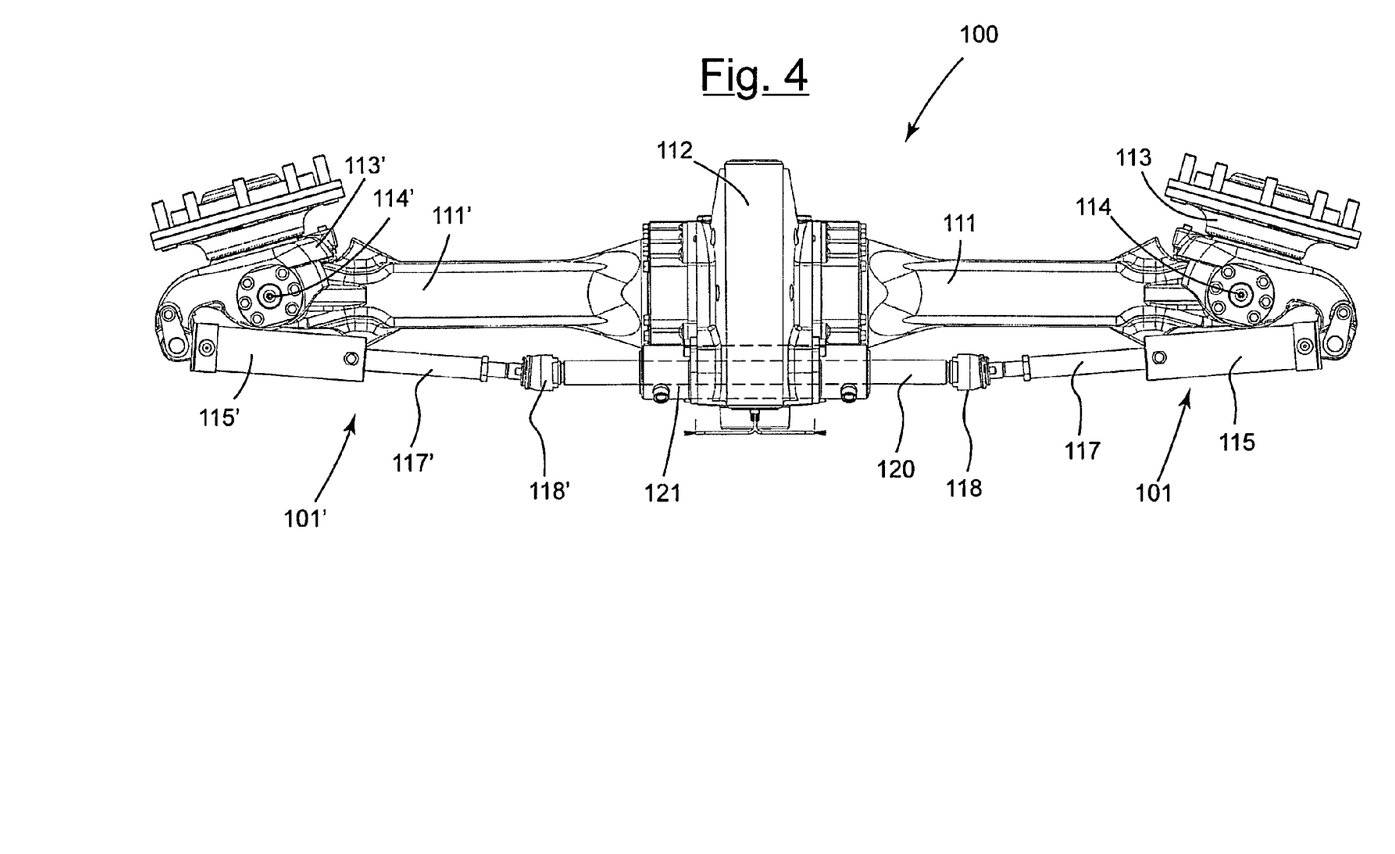
FIG. 4 is a view from above of the steering group of the wheels of the idle axle shown in FIG. 2 in another possible configuration of use according to a steering in which the rotation of the vehicle is effected around a center of a drive axle of the vehicle or a vehicle center.

An embodiment example of said steering group 100 of the wheels 40, 40', 50, 50' of an axle is shown in FIGS. 2-4 and comprises two structural extensions 111, 111' which are respectively connected at one end to a relative wheel-holder group 113, 113' and at another end to a portion 112 rigidly connected, or oscillating, with respect to the vehicle 30.

In particular, the wheel-holder groups 113, 113' are respectively rotatingly connected to the two structural extensions 111, 111' around a relative first pin 114, 114'.

According to the invention, the steering group 100 also comprises steering means 101, 101' of the wheel-holder groups 113, 113' equipped with two independent telescopic units 115, 117, 115', 117' capable of steering the relative wheel-holder groups 113, 113' having a common axis according to independent steering geometries.

Each telescopic unit 115, 117, 115', 117' is rotatingly connected to the relative wheel-holder group 113, 113' by means of a second pin 116, 116', and comprises a first sleeve element 115, 115' and a first rod element 117, 117' which slides inside the first sleeve element 115, 115'.

The relative independent movement of the first rod element 117, 117' inside the relative first sleeve element 115, 115' modifies, independently of the normal steering geometry (FIG. 5), the angular position of the relative wheel-holder group 113, 113' with respect to the structural extensions 111, 111' allowing a geometry of the type shown in FIG. 4, to be reached.

Furthermore, each steering group 100 also comprises a main moveable steering stem 120 in a main steering sleeve 121, rigidly constrained to the vehicle, from which it at least partially protrudes laterally with relative ends both equipped with an articulated element 118, 118'.

According to the embodiment shown in FIGS. 2-4, the first sleeve elements 115, 115' are respectively rotatingly connected to the wheel-holder groups 113, 113' by means of the above second pins 116, 116', the first rod elements 117, 117' are respectively equipped with an end which slides inside the two first sleeve elements 115, 115' and another end spherically connected to the above articulated elements 118, 118', on the opposite part, to the main steering stem 120.

According to illustrative embodiments, the movement of the first rod elements 117, 117' with respect to the first sleeve elements 115, 115' is hydraulically driven, whereas the movement of the main steering stem 120 is driven by means of specific drives directly connected with the rotation of the steering wheel such as a rack or hydraulic actuator.

In particular, the movement of the first rod elements 117, 117' with respect to the first sleeve elements 115, 115' is independent with respect to the movement of the main steering stem 120.

If there is no relative movement between the first rod elements 117, 117' and the respective first sleeves 115, 115', the movement of the main steering stem 120 allows the wheel-holder groups 113, 113' having a common axle to be steered as required, respecting the geometrical constraints imposed on the mechanism by the Ackermann geometry, so that the axes of the wheels 50, 50' of the vehicle 30 intersect upon a single point along a line extending from the wheels 40, 40' of the vehicle 30 when the wheels 50, 50' are rotated from the straight advance position.

This arrangement is shown in FIG. 3 allows the vehicle 30 to effect curved trajectories such as that shown in FIG. 5 in which the steering group 100 with wheels 50, 50', imposes, as described above, an Ackermann geometry on the relative wheels whereas the arrangement shown in FIG. 7 equipped with driving wheels 40, 40', respectively imposes a curved geometry on the wheels 40, 40' around an instantaneous rotation axis 60 of the vehicle 30.

In particular therefore, common-maneuvers which can be effected with the currently known steering devices having an instantaneous rotation center outside the vehicle 30, are also possible with the object of the present invention.

If, on the other hand, the main steering stem 120 is kept in a blocked position and centered with respect to the center line of the vehicle 30 and there is a telescopic movement of the two first rod elements 117, 117' with respect to the relative sleeves 115, 115' on both the right and left side of the common axle, new angular positions of the wheel-holder groups 113, 113' are reached, which are suitable for obtaining geometrical constraints that are such as to impose on the vehicle 30 a rotation around a point positioned on the edge of a side of the ground-support quadrilateral or inside the ground-support quadrilateral, for example, the center of the vehicle 30 itself.

In particular, the instantaneous rotation center is preferably situated in the center of the other axle with respect to that in which the wheels 50,50' are steered as described above and shown in FIG. 6, or, by thus steering all the wheels 40, 40', 50, 50' of the two axles, the vehicle 30 can also effect rotations around its own center, as shown in FIG. 7.

The example of FIG. 6 shows a vehicle 30 in rotation around an axle and this steering is obtained thanks to the arrangement of the wheels 50, 50' of an axle, for example the front idle wheels 50, 50', according to the geometry of FIG. 4, whereas the wheels 40, 40' of the other axle, for example the rear axle equipped with driving wheels 40, 40', are kept fixed parellelly with the vehicle 30, as said rear axle is rigid.

FIG. 7 shows a vehicle according to the invention in which the driving wheels 40, 40' are also arranged according to the geometry of FIG. 4.

In this case, the driving wheels 40, 40' connected to the common axle are advantageously activated in rotation in opposing directions with respect to each other by the differential 10 according to the present invention previously described by imposing on the vehicle 30, a rotation around its own center 60, as shown in FIG. 7.

These opposing angular positions of the wheel-holder groups 113, 113' obtained thanks to the movement of the first two rod elements 117, 117' with respect to the relative sleeves 115, 115' are represented in FIG. 4, whereas FIGS. 6 and 7 illustrate two vehicles 30 in rotation around the center of the other axle, and around the center of the vehicle 30 itself, respectively.

Upon observing the figures in fact, these respectively show three possible different steering configurations of the wheel-holder group 113, 113' with respect to the relative independent positions of the first rod elements 117, 117' and main steering stem 120.

FIG. 2 shows a steering group 100 of the wheels of a vehicle 30, object of the present invention, with a zero steering angle in which the stem 120 protrudes symmetrically from the main steering cylinder 121 and the first rod elements 117, 117' are in such a position, substantially entirely contained, with respect to the relative first sleeves 115, 115' as to impose a zero steering angle on the two wheel-holder groups 113, 113'.

FIG. 3 shows a steering group 100 of the wheels of a vehicle 30 in which the main steering stem 120 has undergone a total axial translation towards the left side of the center of the vehicle 30 whereas the first rod elements 117, 117'—and the first sleeves 115, 115' are in an unaltered position with respect to FIG. 2.

In particular, therefore, this configuration shown in FIG. 3 can be obtained starting from that illustrated in FIG. 2 exclusively thanks to the translation of the main steering stem 120 and effects an Ackermann type steering geometry shown in FIG. 5.

FIG. 4 shows a steering group 100 of a wheel of a vehicle 30 object of the present invention in which the stem 120 is kept in a blocked and centered position with respect to the center of the vehicle 30, the same position as FIG. 2, whereas the first rod elements 117, 117' are placed in a fully extended position with respect to each respective first sleeve 115, 115'.

Consequently, in particular, this configuration shown in FIG. 4, can be obtained starting from that shown in FIG. 2 exclusively thanks to the movement of the first rod elements 117, 117' with respect to the first sleeve elements 115, 115' and allows the vehicle 30 to effect a rotation around the center of the other axle as shown in FIG. 6, or to effect a rotation around the center of the vehicle 30 if the vehicle 30 envisages both the two steering axles equipped with the steering group 100 as shown in FIG. 7, and at least one of the axles comprising the differential 10 shown in FIG. 1.

This latter possibility is schematically shown in FIG. 7.

As can be seen in FIG. 4, the movements of the first rod elements 117, 117' with respect to the relative first sleeve 115, 115', preferably driven hydraulically, allow an extra angular excursion of the wheel-holder groups to be obtained. Further, the stem 120 is shown in a blocked and centered position.

Thanks to the steering group 100 of the wheels of a vehicle 30 according to the present invention, it is advantageously possible to place the wheel-holder groups 113, 113' in a fully extended position with respect to the relative structural extensions 111, 111', as shown in FIGS. 4, 6, and 7.

This aspect is also advantageous because, as the movement of the wheel-holder groups 113, 113' is independent of the movement of the main steering stem 120 and therefore independent of the rotation of the steering wheel, it allows such configurations to be obtained without requiring excessive effort on the part of the user and without the use of the main steering cylinder 121.

The functioning of the device and the object of the invention, can now be easily understood.

The vehicle 30 according to the present invention is equipped with steering groups 100 of the wheels 40, 40', 50, 50' of the two axles and the differential 10 drivingly engaged with the driving wheels 40, 40'.

In particular, these steering groups 100 are equipped with steering means 101, 101' which comprise for each wheel-holder group 113, 113', a telescopic unit 115, 117, 115', 117' each equipped with a first rod element 117, 117' which slides inside a relative first sleeve element 115, 115'.

At least one telescopic unit 115, 117, 115', 117' is interposed between the relative wheel-holder group 113, 113' and a central portion 112 of the axle, which includes a main steering stem 120.

Thanks to the present invention, the steering of the wheel-holder groups 113, 113' is also independent of the movement of the main steering stem 120 in effecting steering geometries which allow the wheels to be arranged so as to allow the vehicle 30 to rotate around the center of the other axle or around the center of the vehicle 30 itself.

In this latter case the driving wheels 40, 40' are advantageously set in rotation by the differential 10 of the present invention in opposite directions, causing the vehicle 30 to rotate around its own center.

The vehicle 30, through use of the steering groups 100, 100', can orient the wheels 40, 40', 50, 50' as illustrated in FIG. 7 and, by means of the differential 10, the vehicle 30 can move around its own center.

It can thus be seen that the vehicle 30 according to the present invention achieves the objectives previously indicated.

The present invention thus conceived can undergo numerous modifications and variants, all included in the same inventive concept; furthermore all the details can be substituted by technically equivalent elements. In practice, the materials used, as also the dimensions, can vary according to technical requirements.

The invention claimed is:

1. A vehicle, comprising:
    a chassis;
    a pair of driving wheels;
    a pair of idle wheels;
    at least one steering group, the steering group capable of positioning one of the pairs of wheels in a steering geometry where an axis of each wheel of the pair of wheels capable of being positioned by the steering group intersects with a remaining axis of each wheel of the remaining pair of wheels within a ground-support quadrilateral formed by the pairs of wheels; and
    a differential comprising:
        an outer case in driving engagement with a crown gear;
        an inner case having a first half-shaft and a second half-shaft opposingly disposed therein, the first half-shaft and the second half-shaft each having a primary toothed gear drivingly disposed thereon, the first half-shaft and the second half-shaft each having at least one of the driving wheels drivingly coupled thereto, the primary toothed gears drivingly engaged with each other using at least two secondary toothed gears, the secondary toothed gears rotatingly assembled on a pin coupled to the inner case, the secondary toothed gears substantially orthogonal to the half-shafts;
        a selective engagement means capable of coupling the inner case to the outer case;
        a selective blocking means capable of coupling the inner case to the chassis; and
        a selective direct gearing means capable of drivingly engaging one of the half shafts with the crown gear;
        wherein when the inner case is coupled to the outer case the first half-shaft and the second half-shaft are driven in a same direction, and when the inner case is coupled to the chassis and one of the half-shafts is drivingly engaged with the crown gear the first half-shaft and the second half-shaft are driven in opposite directions.

2. The vehicle according to claim 1, wherein the selective engagement means comprises a set of engagement balls disposed between the inner case and the outer case.

3. The vehicle according to claim 1, wherein the selective blocking means comprises a first piston, a first spring, and a clutch capable of coupling the inner case to the chassis and the first piston can be moved to compress the first spring and disconnect the selective engagement means coupling the inner case and the outer case, the first piston simultaneously coupling the inner case to the chassis with the clutch element.

4. The vehicle according to claim 1, wherein the selective direct gearing means comprises a second piston, a front engagement unit having a first set of teeth, and a second spring, wherein the second piston can be selectively moved to compress the second spring and engage the first set of teeth of the front engagement unit with a second set of teeth drivingly engaged with one of the half-shafts.

5. The vehicle according to claim 1, wherein the steering group comprises two structural extensions, two wheel-holder groups, and two steering means, each of the wheel-holder groups coupled to a first end of each of the structural extensions and each of the structural extensions coupled at a second end to the vehicle, each of the wheel-holder groups pivotally coupled to the structural extensions about a first pin, the steering means of the wheel-holder groups including two telescopic units, each of the telescopic units including a first sleeve and a first rod, the first rod slidably disposed in the first sleeve, each of the telescopic units pivotally coupled to one the wheel-holder groups with a second pin, each of the telescopic units suitable for independently modifying an angular position of each of the wheel-holder groups with respect to the structural extension each wheel-holder group is coupled to.

6. The vehicle according to claim 5, wherein the steering group further comprises a main steering stem in a main steering sleeve, the main steering sleeve rigidly coupled to the vehicle, the first rod elements being respectively equipped with a first end slidably disposed in the first sleeve elements and a second end spherically coupled to the main steering stem with an articulated element, the main steering stem including two ends which extend in opposing directions, the ends of the main steering stem partially protruding from the main steering sleeve.

7. The vehicle according to claim 5, wherein a movement of the first rod elements with respect to the first sleeve elements is hydraulically controlled.

8. The vehicle according to claim 6, wherein in a movement of the main steering stem is one of rack controlled and hydraulically controlled, and a movement of the first rod elements with respect to the first sleeve elements is hydraulically controlled.

9. The vehicle according to claim 6, wherein a movement of the main steering stem is independent from a movement of the first rod elements with respect to the first sleeve elements.

* * * * *